US008391587B2

(12) United States Patent
Nagai

(10) Patent No.: US 8,391,587 B2

(45) Date of Patent: Mar. 5, 2013

(54) LIQUID CRYSTAL ARRAY INSPECTION APPARATUS AND METHOD FOR CORRECTING IMAGING RANGE

(75) Inventor: Masamichi Nagai, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 301 days.

(21) Appl. No.: 12/995,617

(22) PCT Filed: Jun. 2, 2008

(86) PCT No.: PCT/JP2008/060133

§ 371 (c)(1), (2), (4) Date: Dec. 1, 2010

(87) PCT Pub. No.: WO2009/147707

PCT Pub. Date: Dec. 10, 2009

(65) Prior Publication Data

US 2011/0141137 A1 Jun. 16, 2011

(51) Int. Cl.
*G06K 9/00* (2006.01)

(52) U.S. Cl. ........................................................ 382/143

(58) Field of Classification Search ................... 382/143
See application file for complete search history.

(56) References Cited

U.S. PATENT DOCUMENTS 7,135,676 B2 * 11/2006 Nakasuji et al. .............. 250/310
8,237,119 B2 * 8/2012 Nakahira et al. .............. 250/307

FOREIGN PATENT DOCUMENTS

| | | |
|---|---|---|
| JP | 06-034578 | 2/1994 |
| JP | 11-265678 | 9/1999 |
| JP | 2004-271516 | 9/2004 |
| JP | 2004-309488 | 11/2004 |
| JP | 2008-039439 | 2/2008 |

* cited by examiner

*Primary Examiner* — Samir Ahmed
*Assistant Examiner* — Totam Le
(74) *Attorney, Agent, or Firm* — J.C. Patents

(57) ABSTRACT

In a liquid crystal array inspection that acquires an imaging picture by scanning a liquid crystal substrate in a two-dimensional manner with an electron beam to inspect a liquid crystal substrate array based on the imaging picture, the imaging picture obtained by imaging a stage with the electron beam is used to determine the amounts of displacement of an imaging range of each electron gun in an X direction and a Y direction. Amounts of correction for correcting displacements of the imaging range of each electron gun in the X direction and the Y direction are calculated according to the determined amounts of displacement. The displacement in the X direction is corrected by controlling the scanning with the electron beam in the X direction, and the displacement in the Y direction is corrected by aligning a mounting position of each electron gun in the Y direction.

6 Claims, 13 Drawing Sheets

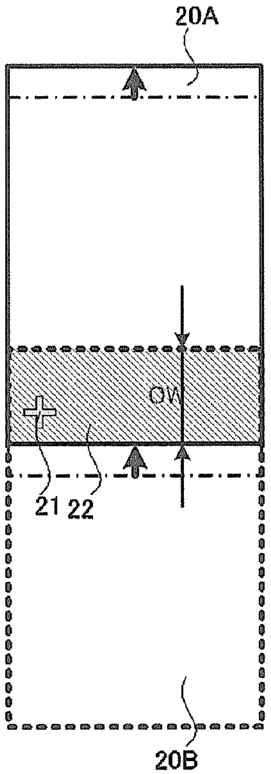
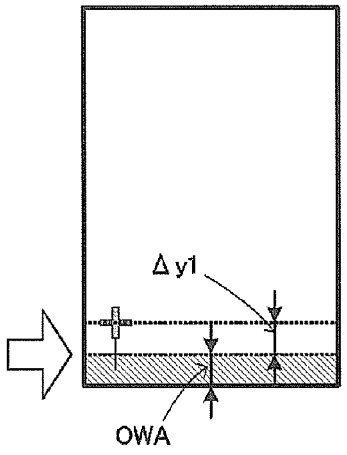
FIG.12(b)
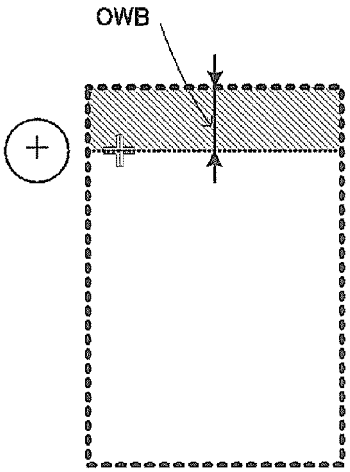
FIG.12(a)
FIG.12(c)
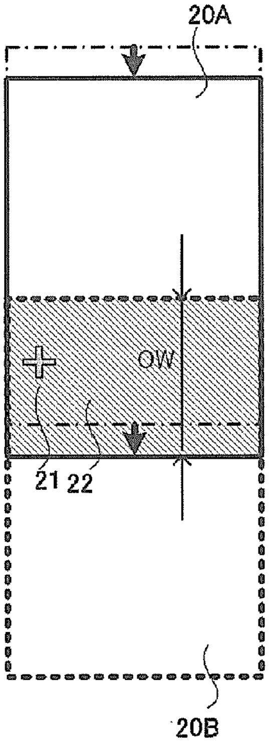
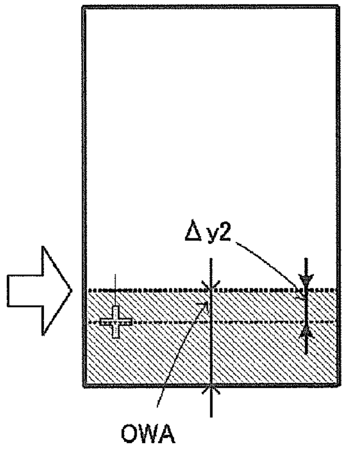
FIG.12(e)
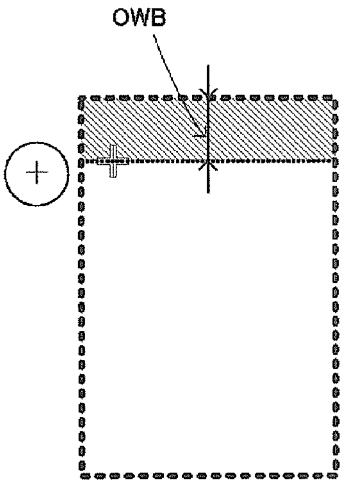
FIG.12(f)
FIG.12(d)

LIQUID CRYSTAL ARRAY INSPECTION APPARATUS AND METHOD FOR CORRECTING IMAGING RANGE

BACKGROUND OF THE INVENTION

1. Field of the Invention

The present invention relates to a liquid crystal array inspection apparatus and a beam scanning apparatus for inspecting a liquid crystal substrate array based on a scan image acquired by scanning the substrate in a two-dimensional manner, using a charged particle beam, such as an electron beam or ion beam.

2. Description of Related Art

A known substrate inspection apparatus applies an inspection signal to an object to be inspected, such as a liquid crystal substrate array, and performs substrate inspection based on a scan image acquired by scanning the substrate in a two-dimensional manner with a charged particle beam, such as an electron beam or ion beam. For example, in the manufacturing process of a Thin Film Transistor (TFT) array substrate used in a TFT display apparatus, whether the manufactured TFT array substrate is correctly driven is being inspected. In the inspection of the TFT array substrate, an electron beam, for example, serving as a charged particle beam is used to scan the TFT array substrate so as to acquire a scan image and the substrate is inspected based on the scan image (Patent Document 1 and Patent Document 2).

In order to enable the electron beam to scan the array in a two-dimensional manner on the liquid crystal substrate, the electron beam is moved to-and-fro in an X direction, and a stage is moved in a Y direction.

For a scanning accomplished by the application of the electron beam and a movement of the stage, it is difficult to achieve a high precision scanning with a scan width of an electron beam emitted by a single electron gun. Accordingly, the entire scan range of a substrate is divided into a plurality of portions, and an electron gun is mounted at each portion. Furthermore, the following control method is used, in which the scan range of each electron gun is divided into a plurality of paths arranged in the X direction, and in each path, the translocation of the stage by a translocation width equivalent to a width of one pixel of the liquid crystal substrate in the Y direction and the scanning with a beam having a scan width equivalent to a width of one pixel in the X direction are alternately performed, so as to acquire a scan image along the path.

FIG. 13(*a*) to FIG. 13(*c*) are views illustrating the scanning of a liquid crystal substrate using electron beams. In FIG. 13(*a*) to FIG. 13(*c*), a plurality of electron guns (GUN1, GUN2, etc.) is disposed in the X direction of the liquid crystal substrate at a specified interval, and the electron gun emits an electron beam onto the liquid crystal substrate. During the emission of the electron beam, each electron gun scans with the electron beam having a scan width Dx in one of a plurality of paths (Path 1 to Path 4 in FIG. 13(*a*) to FIG. 13(*c*)) allocated on the liquid crystal substrate. Through the moving to-and-fro operation of the electron beam of the electron gun, the electron beam scans in a unit of a path; after one path is scanned, the stage is moved so as to scan a neighboring path. When the stage is moved, the stage is only moved by a stage-movement-width Lx, which is equivalent to the width of the path.

FIG. 13(*b*) illustrates a scan state of Path 1, in which the stage is moved only the stage-movement-width Lx from the scan position of Path 1 shown in FIG. 13(*a*), and Path 2 is scanned through the movement. In addition, FIG. 13(*c*) illustrates the situation that the stage is moved only the stage-movement-width Lx from the position of FIG. 13(*b*), and Path 3 is scanned. As such, all the paths set on the liquid crystal substrate are scanned.

During the scanning of each path, an inspection signal is applied to the liquid crystal substrate, and the liquid crystal substrate array is scanned by the electron beam and secondary electrons are detected, so as to acquire a detection signal. One path is divided into a plurality of frames, and the inspection signal is applied to each frame and the detection signal is detected. The inspection signal is applied in all the paths and the detection signal is detected, and the scan images acquired in each scanning are combined, so as to obtain a scan image of the entire substrate.

Moreover, the application of the inspection signal, the scanning with the electron beam and the detection of secondary electrons are performed for multiple times (for example, 20 times) for each frame, so that a plurality of the acquired detection signals overlaps and the signal strength of the detection signal can be increased.

Patent Document 1: Japanese Laid-open Patent Publication No. 2004-271516

Patent Document 2: Japanese Laid-open Patent Publication No. 2004-309488

A plurality of scan images is combined to obtain a scan image of the liquid crystal substrate, and the scan image is acquired by scanning with electron beams from a plurality of electron guns configured in a row in the X direction of the liquid crystal substrate. The electron guns are configured at intervals in a row in the X direction, and the emission angle of the electron beam emitted by each electron gun or other conditions of the electron beam may be inconsistent. Therefore, the imaging range obtained by each electron gun in the X direction may be displaced.

In the case that displacement of the imaging range in the X direction occurs, when a plurality of imaging ranges is combined, an area in the X direction may not be imaged.

In addition, the electron guns arranged in the X direction of the liquid crystal substrate is configured as multiple rows in the Y direction, so that the scanning time for scanning one liquid crystal substrate is shortened. Thus, it is anticipated that the time for inspecting the liquid crystal array can be reduced.

In the structure in which the electron guns are configured in multiple rows as described above, not only the imaging range obtained by the electron guns arranged in each row may be displaced, a displacement may also occur between the rows of the neighboring imaging ranges in the Y direction.

In the case the imaging range in the Y direction is displaced, an area in the Y direction may not be imaged when a plurality of imaging ranges is combined.

SUMMARY OF THE INVENTION

Accordingly, the objective of the present invention lies in solving the problems in the prior art, in which a liquid crystal array inspection is achieved via acquiring an imaging picture by scanning a liquid crystal substrate in a two-dimensional manner using an electron beam and inspecting a liquid crystal substrate array based on the imaging picture. When the imaging pictures of a plurality of electron guns are combined to obtain an imaging picture of the liquid crystal substrate, a displacement of the imaging range of each electron gun is corrected.

In particular of the objective of the present invention, the electron guns are arranged as a row in an X direction of the liquid crystal substrate and they are arranged in multiple rows in a Y direction of the liquid crystal substrate; a plurality of scan images, acquired by scanning with an electron beam from each electron gun, is combined; and the liquid crystal substrate array is inspected based on the scan images, so that the imaging range of each electron gun can be corrected in the liquid crystal array inspection.

In the present invention, the imaging picture obtained by imaging a stage with the electron beam is used to determine the amounts of displacement of the imaging range of each electron gun in the X direction and the Y direction, and the amounts of correction for correcting the displacements of the imaging range of each electron gun in the X direction and the Y direction are calculated according to the determined amounts of displacement. The displacement in the X direction is corrected by controlling the scanning with the electron beam in the X direction, and the displacement in the Y direction is corrected by aligning a mounting position of each electron gun in the Y direction.

Accordingly, when the imaging pictures of a plurality of electron guns are combined to obtain an imaging picture of the liquid crystal substrate, a displacement of the imaging range of each electron gun can be corrected. In addition, the electron guns are arranged as multiple rows in an X direction of the liquid crystal substrate and they are arranged in multiple rows in a Y direction of the liquid crystal substrate, and a displacement of the imaging range of each electron gun can be corrected.

The liquid crystal array inspection apparatus of the present invention, for acquiring an imaging picture by scanning a liquid crystal substrate with an electron beam in a two-dimensional manner to inspect a liquid crystal substrate array based on the acquired imaging picture, includes: a stage, for carrying the liquid crystal substrate; a plurality of electron guns, configured above the stage in an X direction and a Y direction; a scan control part, for controlling the scanning with electron beams of the electron guns; a plurality of detectors, for detecting secondary electrons emitted during the scanning of the electron beams of the electron guns; an image processing part, for generating imaging pictures of the imaging range scanned by the electron guns according to detection signals of the detectors; an correction-amount calculating part, for determining the amounts of displacement of the imaging range of each electron gun in the X direction and the Y direction according to the imaging picture of the stage generated by the image processing part, and calculating the amounts of correction for correcting the displacements of the imaging range of each electron gun in the X direction and the Y direction according to the determined amounts of displacement; and a defect determining part, for inspecting a defect of the array according to the imaging picture of the substrate generated by the image processing part.

The scan control part of the present invention controls the scanning with the electron beam in the X direction based on the amount of correction of the imaging range in the X direction calculated by the correction-amount calculating part.

The correction-amount calculating part of the present invention determines a displacement of the imaging range obtained by each electron gun through the scanning operation, and calculates the amount of correction based on the displacement, and thereby corrects the displacement of each electron gun.

The liquid crystal array inspection apparatus of the present invention includes the following functions: imaging a mark set on the stage, identifying the mark in the imaging picture, and determining an amount of displacement of the imaging range according to a difference between a detected position of the mark and a reference position of the mark so as to determine the displacement and to calculate the amount of correction.

The stage includes a plurality of marks, configured at an interval, along the X direction on a surface opposite to the electron guns, and the interval between the marks in the X direction is preset to be the same as the interval between the electron guns in the X direction.

The image processing part generates an imaging picture for each electron gun, and the correction-amount calculating part includes the following functions: identifying a mark in each imaging picture and detecting a position of the identified mark. Furthermore, the correction-amount calculating part includes the following functions: determining an amount of displacement of the imaging range of each electron gun in the X direction according to the difference between the detected position of the mark and the reference position of the mark; and calculating an amount of correction of the imaging range of each electron gun in the X direction according to the determined amount of displacement in the X direction.

In addition, the correction-amount calculating part includes the following functions: determining an amount of displacement of the imaging range of each electron gun in the Y direction according to the detected position of the mark and the reference position of the mark in neighboring imaging pictures in the Y direction and calculating an amount of correction of the imaging range of each electron gun in the Y direction according to the determined amount of displacement in the Y direction.

The scan control part controls the scanning of the electron beam in the X direction, and corrects the imaging range in the X direction based on the amount of correction of the imaging range of each electron gun in the X direction calculated by the correction-amount calculating part.

An exemplary correction-amount calculating part includes the following functions: for each row of electron guns arranged in the X direction, calculating a mean value of the difference between the detected position and the reference position of the mark in the X direction determined according to the imaging range of each electron gun in the row to serve as an amount of displacement of column in the X direction; and calculating an amount of correction of the imaging ranges of the row of electron guns in the X direction according to the calculated amount of displacement.

In the exemplary construction, for the row of the electron guns arranged in the X direction, the amount of correction is for the controlling of the scanning of each electron gun, and the imaging range of each electron gun in the X direction is corrected. The control of the scanning of the electron gun is performed in the following manner, for example: the scan control part adjusts a voltage applied to a deflection lens corresponding to the amount of correction, so as to change deflection of the electron beam in the X direction.

In addition, the correction-amount calculating part includes the following functions: for an overlapping area of the imaging ranges of two neighboring electron guns in the Y direction, calculating an amount of overlapping according to the difference between the detected position of the mark and the reference position of the mark of each imaging range; calculating an amount of displacement of each imaging range in the Y direction according to the amount of overlapping of the imaging range; and calculating an amount of correction for correcting the mounting positions of the two neighboring electron guns in the Y direction according to the amount of displacement.

In addition, a method for correcting an imaging range of a liquid crystal array inspection apparatus of the present invention is used for correcting an imaging range of a liquid crystal array inspection apparatus, wherein the liquid crystal array inspection apparatus is used for acquiring an imaging picture by scanning a liquid crystal substrate with an electron beam in a two-dimensional manner to inspect a liquid crystal substrate array based on the acquired imaging picture.

A plurality of electron guns acquiring imaging pictures is configured by arranging the electron guns in an X direction above a stage carrying the liquid crystal substrate, wherein there are at least two rows of the electron guns arranged in a Y direction.

According to the correction method of the present invention, the imaging range is corrected by the following steps: acquiring imaging pictures by scanning the stage with electron beams of the electron guns; determining the amounts of displacement of the imaging range of each electron gun in the X direction and the Y direction according to the acquired imaging pictures, and calculating the amounts of correction for correcting the displacements of the imaging range of each electron gun in the X direction and the Y direction according to the amounts of displacement; controlling the scanning of the electron beam in the X direction based on the calculated amount of correction of the imaging range in the X direction; and aligning the mounting position of each electron gun in the Y direction based on the calculated amount of correction of the imaging range in the Y direction.

In the above steps, the step of acquiring the imaging pictures is performed by the electron guns, detectors, a scan control part and an image processing part, the step of calculating the amount of correction is performed by an correction-amount calculating part, and the control of scanning of the electron beam in the X direction based on the amount of correction is performed by a scan control part. Correction in the Y direction is performed by aligning the mounting positions of the electron guns.

In addition, the liquid crystal array inspection apparatus includes a plurality of marks along the X direction on a surface of the stage opposite to the electron guns, and the interval between the marks in the X direction is preset to be the same as the interval between the electron guns in the X direction. In the liquid crystal array inspection apparatus, the marks are used for calculating the amounts of displacement and the amounts of correction.

The step of calculating the amounts of correction includes: identifying a mark in each imaging picture and detecting a position of the identified mark. The step of calculating the amount of correction in the X direction includes: determining an amount of displacement of the imaging range of each electron gun in the X direction according to a difference between the detected position of the mark and a reference position of the mark, and calculating an amount of correction of the imaging range of each electron gun in the X direction according to the determined amount of displacement. In another aspect, the step of calculating the amount of correction in the Y direction includes: determining an amount of displacement of the imaging range of each electron gun in the Y direction according to the detected position of the mark and the reference position of the mark in neighboring imaging pictures in the Y direction, and calculating an amount of correction of the imaging range of each electron gun in the Y direction according to the determined amount of displacement.

The step of controlling the scanning in the X direction includes controlling the scanning with the electron beam in the X direction and correcting the imaging range in the X direction based on the calculated amount of correction of the imaging range of each electron gun in the X direction.

In a specific example of the step of calculating the amounts of correction, the step of calculating the amount of correction in the X direction includes: for each row of electron guns arranged in the X direction, calculating a mean value of the difference between the detected position and the reference position of the mark in the X direction determined according to the imaging range of each electron gun in the row to serve as an amount of displacement of the row in the X direction, and calculating an amount of correction of the imaging ranges of the row of electron guns in the X direction according to the amount of displacement.

In another aspect, the step of calculating the amount of correction in the Y direction includes: for an overlapping area of the imaging ranges of two neighboring electron guns in the Y direction, calculating an amount of overlapping according to the difference between the detected position of the mark and the reference position of the mark of each imaging range, calculating an amount of displacement of each imaging range in the Y direction according to the amount of overlapping of the imaging range, and calculating an amount of correction for correcting the mounting positions of the two neighboring electron guns in the Y direction according to the amount of displacement.

EFFECT OF THE INVENTION

According to the present invention, in a liquid crystal array inspection that acquires an imaging picture by scanning a liquid crystal substrate in a two-dimensional manner with an electron beam to inspect a liquid crystal substrate array based on the imaging picture, wherein when the imaging pictures of a plurality of electron guns are combined to obtain an imaging picture of the liquid crystal substrate, a displacement of the imaging range of each electron gun can be corrected.

In addition, the electron guns are arranged as a row in an X direction of the liquid crystal substrate and they are arranged in multiple rows in a Y direction of the liquid crystal substrate. A plurality of scan images acquired by scanning with an electron beam from each electron gun is combined, and the liquid crystal substrate array is inspected based on the scan images, so that the imaging range of each electron gun can be corrected in the liquid crystal array inspection.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 12(*a*) to FIG. 12(*f*) are views illustrating calculation of an amount of overlapping in a Y direction according to the present invention.

DESCRIPTION OF THE EMBODIMENTS

Reference will now be made in detail to the present embodiments of the invention, examples of which are illustrated in the accompanying drawings.

Figure 1:
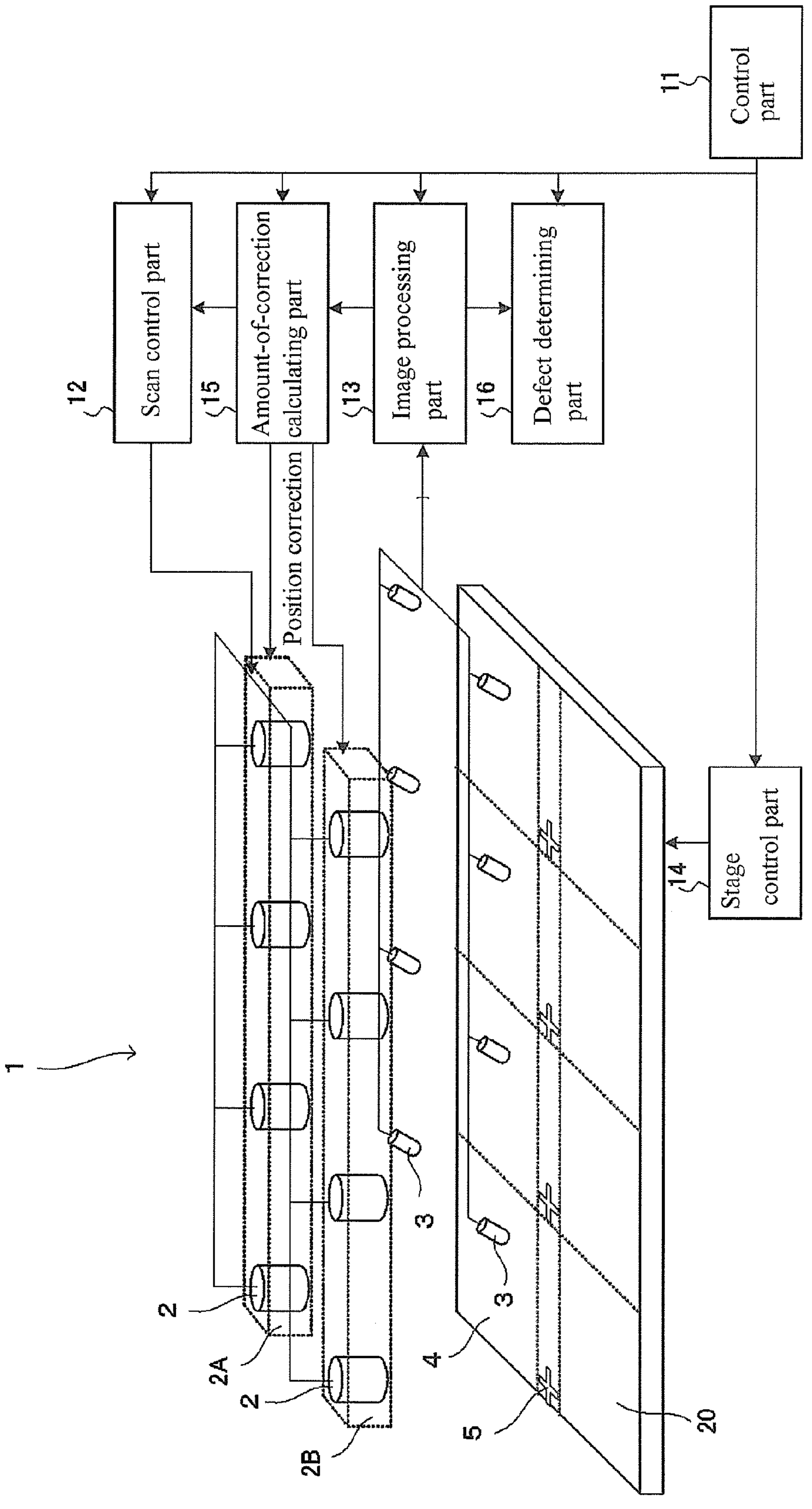
FIG. 1 is a schematic block diagram illustrating an exemplary construction of a liquid crystal array inspection apparatus according to the present invention.

FIG. 1 is a schematic block diagram illustrating an exemplary construction of a liquid crystal array inspection apparatus according to the present invention. In FIG. 1, a liquid crystal array inspection apparatus 1 includes: a stage 4, for carrying a liquid crystal substrate (not shown); a plurality of electron guns 2, configured above the stage 4 in an X direction and a Y direction; a scan control part 12, for controlling the scanning with electron beams of the electron guns 2; a plurality of detectors 3, for detecting secondary electrons emitted during the scanning with the electron beams of the electron guns 2; an image processing part 13, for generating imaging pictures of imaging ranges scanned by the electron guns 2 according to the detection signals of the detectors 3; a correction-amount calculating part 15, for determining the amounts of displacement of the imaging range of each electron gun 2 in the X direction and the Y direction according to the imaging picture of the stage 4 generated by the image processing part 13, and calculating the amounts of correction for correcting the displacements of the imaging range of each electron gun 2 in the X direction and the Y direction according to the amounts of displacement; and a defect determining part 16, for inspecting a defect of the array according to the imaging picture of the substrate generated by the image processing part 13.

The electron guns 2 are configured as a row at a specified interval in the X direction of the imaging ranges of the electron guns 2, and there are at least two rows of the electron guns 2 configured in the Y direction. Moreover, the number of the rows of electron guns configured in the Y direction is not limited to two, and may be more than two. FIG. 1 shows an exemplary configuration of a first row 2A of electron guns and a second row 2B of electron guns.

The electron beam of each electron gun 2 is moved back-and-forth at least in the X direction, so as to scan the liquid crystal substrate (not shown) carried on the stage 4. For example, the amount and the direction of deflection of the electron beam are changed by changing a voltage applied to a deflection lens, so that the electron beam can scan in the X direction.

The detectors 3 detect the secondary electrons emitted from the liquid crystal substrate during the scanning with the electron beams. The image processing part 13 inputs detection signals of the detectors 3 and generates imaging pictures. Imaging ranges of the imaging pictures are consistent with the scan ranges of the electron beams on the liquid crystal substrate. The detectors 3 are configured corresponding to the electron guns 2, and output a detection signal corresponding to the scanning of each electron gun 2. Accordingly, an imaging picture is formed corresponding to each electron gun 2. The interval between the electron guns 2 in a row is arranged according to the scan width of each electron gun.

A mark 5 for detecting a displacement of the imaging range 20 of each electron gun 2 is set on the stage 4. The electron beam of the electron gun 2 scans the mark 5 of the stage 4, so as to acquire an image of the mark 5 in the imaging range 20. Since the position of the mark in the imaging range 20 corresponds to the displacement of the imaging range 20, the displacement of the imaging range 20 may be determined by detecting the position of the mark in the imaging range 20.

The correction-amount calculating part 15 includes the following functions: identifying a mark in each imaging picture generated by the image processing part 13 and detecting a position of the identified mark; determining an amount of the imaging range of each electron gun in the X direction according to a difference between the detected position of the mark and a reference position of the mark; and calculating an amount of correction of the imaging range of each electron gun in the X direction according to the amount of displacement in the X direction. In addition, the correction-amount calculating part 15 includes the following functions: determining an amount of displacement of the imaging range of each electron gun in the Y direction according to the detected position of the mark and the reference position of the mark in adjacent imaging pictures in the Y direction; and calculating an amount of correction of the imaging range of each electron gun in the Y direction according to the amount of displacement in the Y direction.

The scan control part 12 controls the scanning with the electron beam emitted by each electron gun 2 in the X direction, and corrects the imaging range in the X direction, based on the amount of correction of the imaging range of each electron gun in the X direction calculated by the correction-amount calculating part 15.

The stage control part 14 controls the movement of the stage 4, and controls the movement of the liquid crystal substrate carried on the stage 4 in the Y direction. The liquid crystal substrate is moved in the Y direction via the movement of the stage 4, and the electron beam is deflected in the X direction through the electron gun 2, so that an imaging picture can be acquired in a two-dimensional imaging range by scanning the liquid crystal substrate in a two-dimensional manner.

In addition, the liquid crystal array inspection apparatus 1 includes a control part 11 for controlling the whole apparatus, and the control part 11 controls the timing of the scan control part 12, the image processing part 13, the stage control part 14, the correction-amount calculating part 15, and the defect determining part 16.

Figure 2:
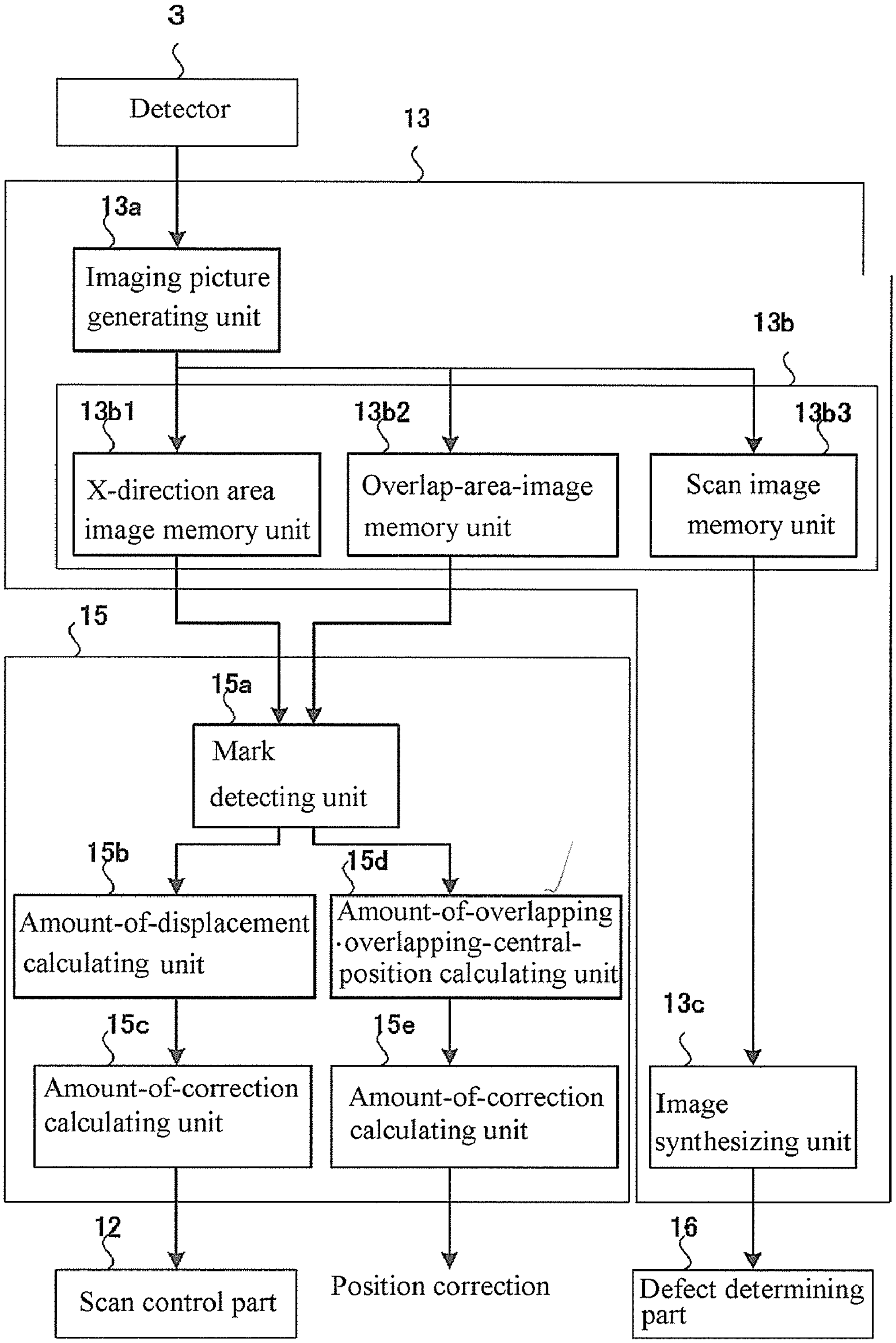
FIG. 2 is a schematic block diagram illustrating an exemplary construction for performing the functions of an image processing part and an correction-amount calculating part according to the present invention.

Then, FIG. 2 illustrates an exemplary construction for implementing the functions of the image processing part 13 and the correction-amount calculating part 15 according to the present invention. Moreover, the exemplary construction may implement the functions in the form of software by a Central Processing Unit (CPU) and programs stored in a memory unit for calculating the processing sequence, the displacement or the amount of correction, or the exemplary construction may implement the mechanisms through hardware. In addition, the exemplary construction shown in FIG. 2 is merely an example, and the present invention is not limited thereto.

In FIG. 2, the image processing part 13 includes an imaging picture generating unit 13*a*, an image memory unit 13*b* for storing the generated imaging pictures, and an image synthesizing unit 13*c*. The imaging picture generating unit 13*a* inputs a detection signal detected by the detectors 3, and uses the detection signal to generate an imaging picture.

The imaging picture generating unit 13*a* generates: scan area images, for calculating the amount of displacement of the imaging range in the X direction; overlap area images, for calculating the amount of overlapping area caused by the overlapping of adjacent imaging ranges in the Y direction; and scan images, for determining a defect of the liquid crystal array.

The image memory unit 13*b* includes: an X-direction area image memory unit 13*b*1 for storing the area images in the row in the X direction generated by the imaging picture generating unit 13*a*, an overlap-area-image memory unit 13*b*2 for storing the overlap-area images, and a scan image memory unit 13*b*3 for storing the scan images.

The image synthesizing unit 13*c* combines the scan images stored in the scan image memory unit 13*b*3, so as to generate a scan image of the entire surface of the liquid crystal substrate.

The scan image memory unit 13*b*3 stores the imaging range of each electron gun obtained by a correction based on the amount of correction calculated by the correction-amount calculating part 15, so that the imaging ranges can be combined in a two-dimensional manner to obtain an imaging picture of the entire liquid crystal substrate.

The correction-amount calculating unit 15 includes: units (15*b*, 15*c*), for performing the functions of calculating the amount of displacement and the amount of correction of the imaging range in the X direction; units (15*d*, 15*e*), for performing the functions of calculating the amount of displacement and the amount of correction of the imaging range of each electron gun in the Y direction; and a mark detecting unit 15*a*, for detecting a common mark position of the two calculating units.

The mark detecting unit 15*a* identifies a mark in each imaging picture, and detects a position of the mark in the imaging picture. For example, shape data featuring the mark is prepared, and a shape highly matches the shape data is detected in the imaging picture, so that the mark can be identified.

The amount-of-displacement calculating unit 15*b* calculates the amount of displacement and the amount of correction of the imaging range in the X direction. The amount-of-displacement calculating unit 15*b* calculates the amount of displacement of the imaging range of each electron gun in the X direction by comparing the position mark detected in the imaging picture imaged by each electron gun of the row of electron guns configured in the X direction with a reference position in the X-direction area image memory unit 13*b*1.

The correction-amount calculating unit 15*c* calculates the amount of correction for correcting the displacement of the imaging picture based on the amount of displacement calculated by the amount-of-displacement calculating unit 15*b*. The scan control part 12 corrects the displacement of the imaging range in the X direction by adjusting the deflection of the electron beam of each electron gun in the X direction by using the correction amount calculated by the correction-amount calculating unit 15*c*.

In an example of calculating the amount of correction, for example, for each row of electron guns arranged in the X direction, the difference between the detected position and the reference position of the mark in the X direction is determined according to the imaging range of each electron gun in the row, and a mean value of the differences is determined and is used as an amount of displacement of the row of the electron guns in the X direction. When an amount of correction based on the mean value is used to correct the displacement in the X direction, displacements of a plurality of electron guns configured in the X direction are averagely corrected by using the same amount of correction.

In addition, in other examples of calculating the amount of correction, the difference between the detected position and the reference position of the mark in the X direction determined according to the imaging range of each electron gun may also be used as an amount of displacement of each imaging range. As such, when an amount of correction of each electron gun is used to correct the displacement in the X direction, displacements of a plurality of electron guns configured in the X direction may be corrected individually.

In another aspect, an amount-of-overlapping•overlapping-central-position calculating unit 15*d* may be used as a unit for calculating the amount of displacement of the imaging range of each electron gun in the Y direction. The amount-of-overlapping•overlapping-central-position calculating unit 15*d* is configured such that the imaging ranges of the adjacent electron guns in the Y direction overlap, and calculates the amount of displacement in the Y direction based on an amount of overlapping and an overlapping central position of an overlapping area of two imaging ranges. When a displacement occurs to the imaging ranges of the adjacent electron guns in the Y direction, the amount of overlapping and the overlapping central position of the overlapping area may be changed. The amount-of-overlapping•overlapping-central-position calculating unit 15*d* calculates the amount of displacement in the Y direction according to the amount of overlapping area, and calculates the positions of the two imaging ranges according to the overlapping central position.

The correction-amount calculating unit 15*e* calculates the amount of correction for correcting the displacement of each imaging picture in the Y direction based on the amount of overlapping and the overlapping central position calculated by the amount-of-overlapping•overlapping-central-position calculating unit 15*d*. For the overlapping area of the imaging ranges of two adjacent electron guns in the Y direction, the amount of overlapping is calculated according to the difference between the detected position of the mark and the reference position of the mark of each imaging range. In addition, the amount of displacement of each imaging range in the Y direction is calculated according to the amount of overlapping of the imaging range, and the amount of correction for correcting the mounting positions of the two adjacent electron guns in the Y direction is calculated according to the amount of displacement. The adjacent electron guns in the Y direction are aligned in the Y direction based on the amount of correction calculated by the correction-amount calculating unit 15*e*.

The correction-amount calculating part 15 according to the present invention may use the amount-of-displacement calculating unit 15*b* and the correction-amount calculating unit 15*c* to calculate the amount of correction for aligning the positions in the X direction of the row of electron guns configured in the X direction, and may use the amount-of-overlapping•overlapping-central-position calculating unit 15*d* to calculate the amount of correction for aligning the positions in the Y direction of the adjacent electron guns in the Y direction, so that correction in the X direction and correction in the Y direction can be achieved.

The defect determining part 16 determines a defect of the liquid crystal substrate based on the imaging picture synthesized by the image synthesizing unit 13*c*.

Figure 3A:
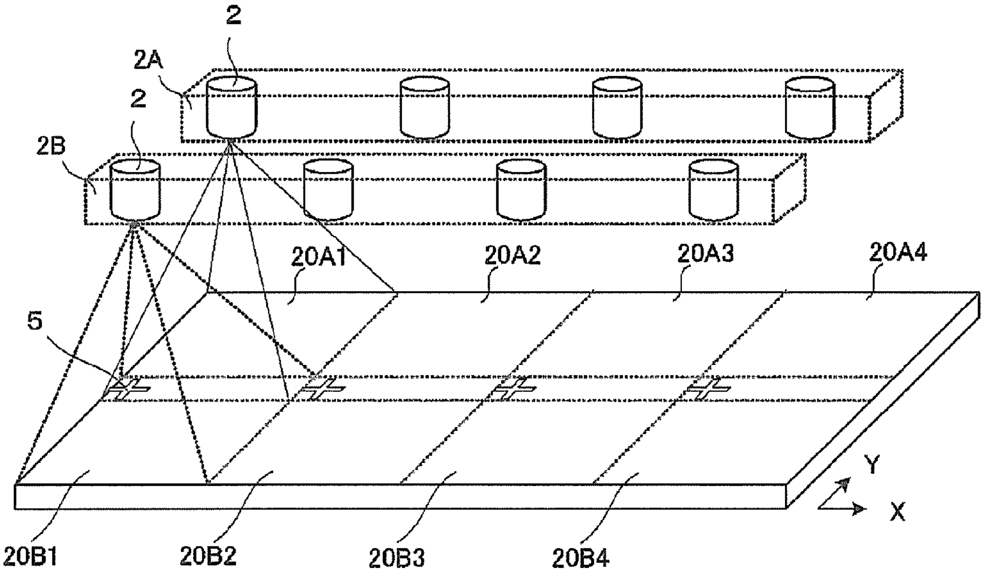
FIG. 3(*a*) and FIG. 3(*b*) are views illustrating a relation between a plurality of electron guns and imaging ranges in liquid crystal array inspection according to the present invention.
Figure 3B:
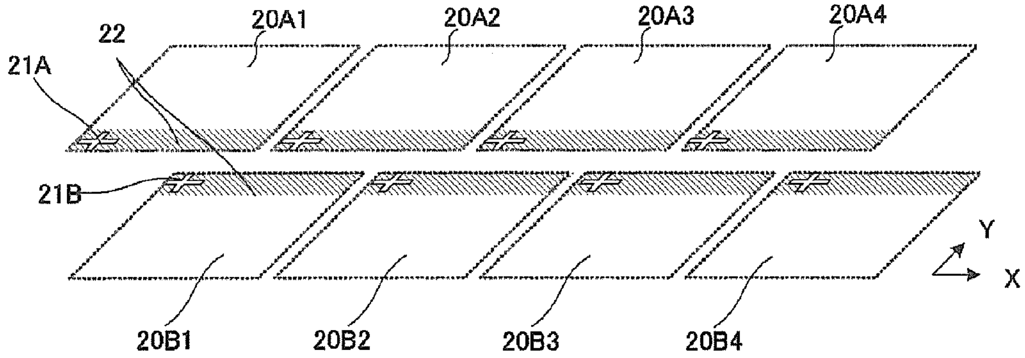
Figure 4A:
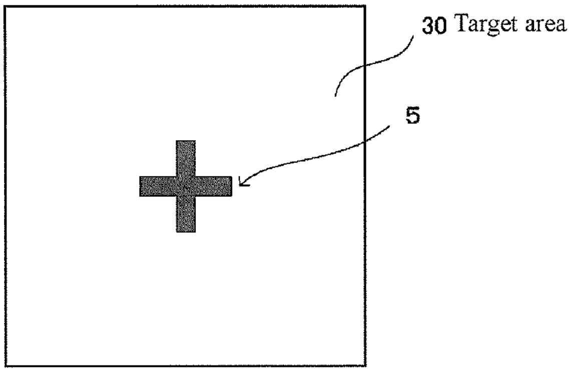
FIG. 4(*a*) to FIG. 4(*c*) are views illustrating a relation between a plurality of electron guns and imaging ranges in liquid crystal array inspection according to the present invention.
Figure 4B:
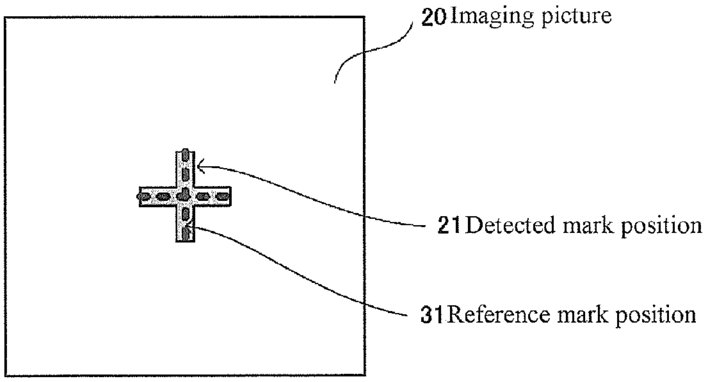
Figure 4C:
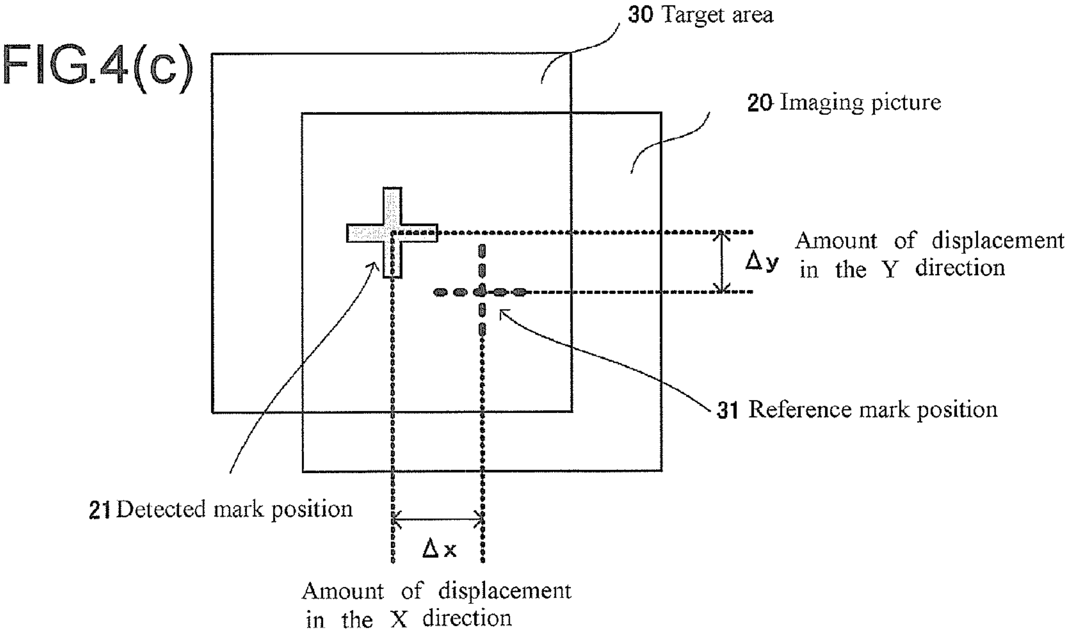

Then, FIG. 3(*a*) and FIG. 3(*b*), and FIG. 4(*a*) to FIG. 4(*c*) illustrate the relations between a plurality of electron guns and imaging ranges in a liquid crystal array inspection apparatus according to the present invention.

A plurality of electron guns 2 is configured in a row in an X direction of a liquid crystal substrate (not shown) and a plurality of the rows is configured in a Y direction to provide the two-dimensional configuration. FIG. 3(*a*) and FIG. 3(*b*) illustrate a first row 2A and a second row 2B each configured with four electron guns 2 in the X direction, and the first row 2A and the second row 2B configured in the Y direction.

The four electron guns 2 of the first row 2A acquire pictures of imaging ranges 20A1 to 20A4, the four electron guns 2 of the second row 2B acquire pictures of imaging ranges 20B1 to 20B4, and the pictures of the imaging ranges 20A1 to 20A4 and 20B1 to 20B4 are combined, so as to obtain an imaging picture of the entire surface of the liquid crystal substrate.

Moreover, the number of the electron guns configured in the X direction and the number of the rows of the electron guns configured in the Y direction are not limited to the example shown in FIG. 3(*a*) and FIG. 3(*b*), and may be determined according to the size of the liquid crystal substrate or the scanning range of the electron beams of the electron guns.

Marks 5 are set at a specified interval along the X direction on the stage 4 carrying the liquid crystal substrate, and each electron gun 2 acquires the pictures of the imaging ranges 20A1 to 20A4 and 20B1 to 20B4 by scanning in a scan range including the mark 5. Therefore, the marks 5 are written into the pictures of the imaging ranges 20A1 to 20A4 and 20B1 to 20B4.

In addition, each electron gun 2 scans in such a way that two scan ranges of adjacent electron guns in the Y direction partially overlap, and a common mark 5 is written into the overlapping area of the imaging pictures with the overlapping scan ranges.

FIG. 3(*b*) shows the pictures of the imaging ranges 20A1 to 20A4 and 20B1 to 20B4 obtained by scanning with the electron beams of the electron guns of the first row 2A and the electron guns of the second row 2B. Each of the pictures of the imaging ranges 20A1 to 20A4 and 20B1 to 20B4 is obtained by scanning with the electron beam of each electron gun, and a mark image 21 of the corresponding mark 5 is written into each imaging picture.

In addition, the picture of the imaging range 20A1 and the picture of the imaging range 20B1 acquired by adjacent electron guns in the Y direction include an overlapping area 22A where the imaging ranges partially overlap, and mark images 21A and 21B of the same mark 5 are written into the overlap area 22. Dashed-line portions in FIG. 3(*b*) represent the overlapping area 22.

In the present invention, the mark written into the imaging range is used, and the detected position of the mark and the reference position of the mark are compared, so as to calculate the amount of displacement of the imaging range of each electron gun in the row of electron guns in the X direction. In addition, between the adjacent imaging pictures, the amount of overlapping is calculated by using the same mark as a reference, and the position of the mark is calculated for use as the overlapping central position.

FIG. 4(*a*) to FIG. 4(*c*) are views illustrating a mark written into an imaging picture. FIG. 4(*a*) shows a target area 30, in which a mark 5 is set. FIG. 4(*b*) shows an imaging picture acquired by imaging the target area 30 without any displacement. In this case, no displacement exists between the imaging range 20 and the target area 30, so that a detected mark position 21 of the mark image detected in the imaging range 20 is consistent with a reference mark position 31.

On the other hand, FIG. 4(*c*) shows an imaging picture acquired by imaging the target area 30 in a state of displacement. In this case, a displacement exists between the imaging range 20 and the target area 30, so that the detected mark position 21 of the mark image detected in the imaging range 20 is detected as be departed from the reference mark position 31.

The amount of displacement of the imaging range 20 may be determined according to the amount of displacement between the detected mark position 21 and the reference mark position 31. In FIG. 4(*c*), the displacement of the imaging range 20 in the X direction is represented by $\Delta x$, and the displacement of the imaging range 20 in the Y direction is represented by $\Delta y$.

According to the arrangement of the marks in the present invention, since a plurality of marks is arranged along the disposition of the electron guns in the X direction, the amount of displacement of each electron gun in the X direction can be calculated according to the amount of displacement of each mark. Therefore, the displacement $\Delta x$ of the imaging range 20 in the X direction is used for calculation.

In another aspect of the arrangement of the marks in the present invention, since a plurality of marks is not arranged along the disposition of the electron guns in the Y direction, the amount of displacement of each electron gun in the Y direction cannot be calculated according to the amount of displacement of each mark. Therefore, the adjacent imaging pictures in the Y direction are obtained in a partially overlapping manner and an overlap area is set. The same mark is imaged in the overlapping area, the amount of displacement in the Y direction is determined according to the amount of overlapping, and the position of the mark is calculated and used as the overlapping central position.

Moreover, when a plurality of marks is set in the Y direction along the arrangement of the electron guns in the Y direction, the same scheme as that for processing the displacement in the X direction may be adopted.

Figure 5A:
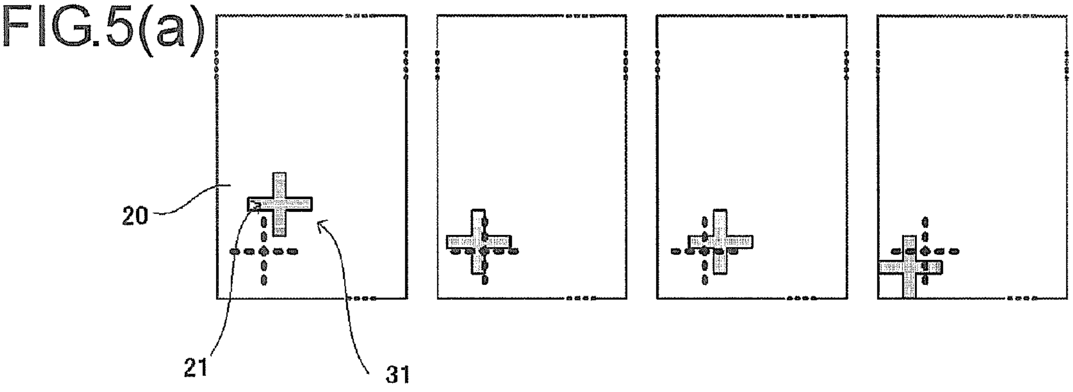
FIG. 5(*a*) to FIG. 5(*c*) are views of imaging pictures illustrating a displacement of the imaging range of each electron gun in the X direction.
Figure 5B:
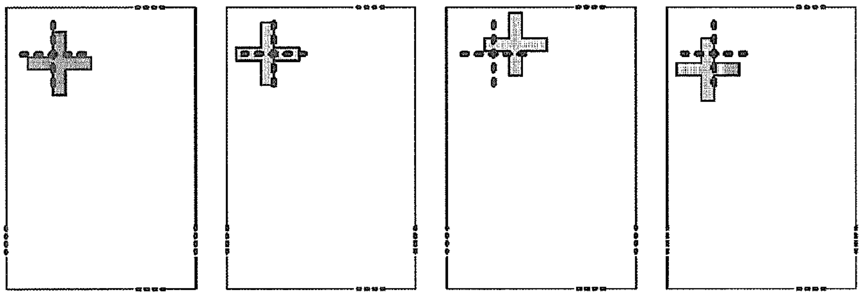
Figure 5C:
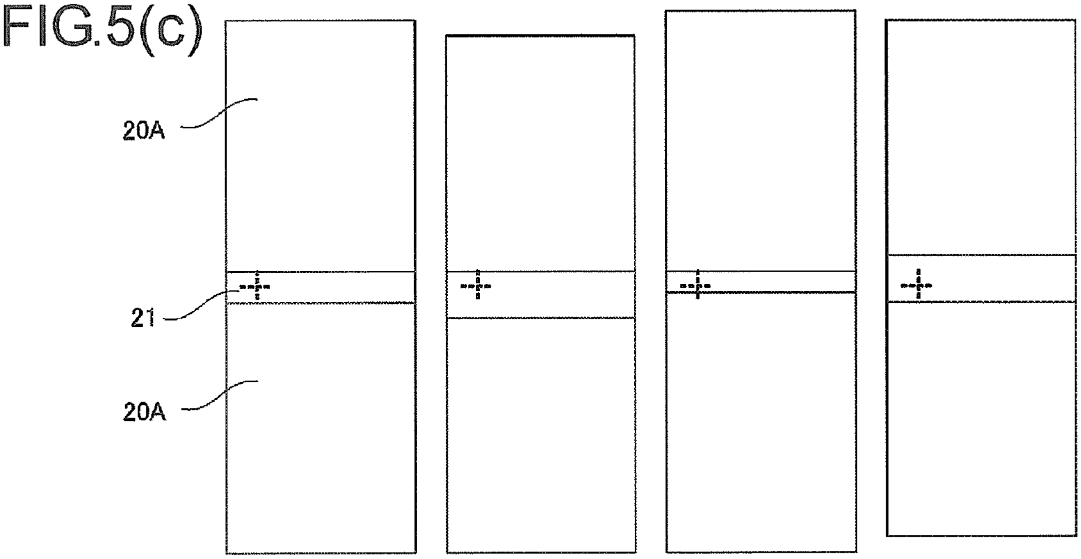

FIG. 5(*a*) and FIG. 5(*b*) are views of imaging pictures illustrating a displacement of the imaging range of each electron gun in the row of electron guns in the X direction. FIG. 5(*a*) shows an example of the imaging pictures of the first row, and FIG. 5(*b*) shows an example of the imaging pictures of the second row. In addition, FIG. 5(*c*) is a view of imaging pictures illustrating an amount of overlapping between adjacent imaging pictures. In FIG. 5(*a*) to FIG. 5(*c*), the mark denoted by dashed lines represents the reference mark position 31, and the mark denoted by solid lines represents the detected mark position 21 of the mark image detected in the imaging range 20.

Figure 6:
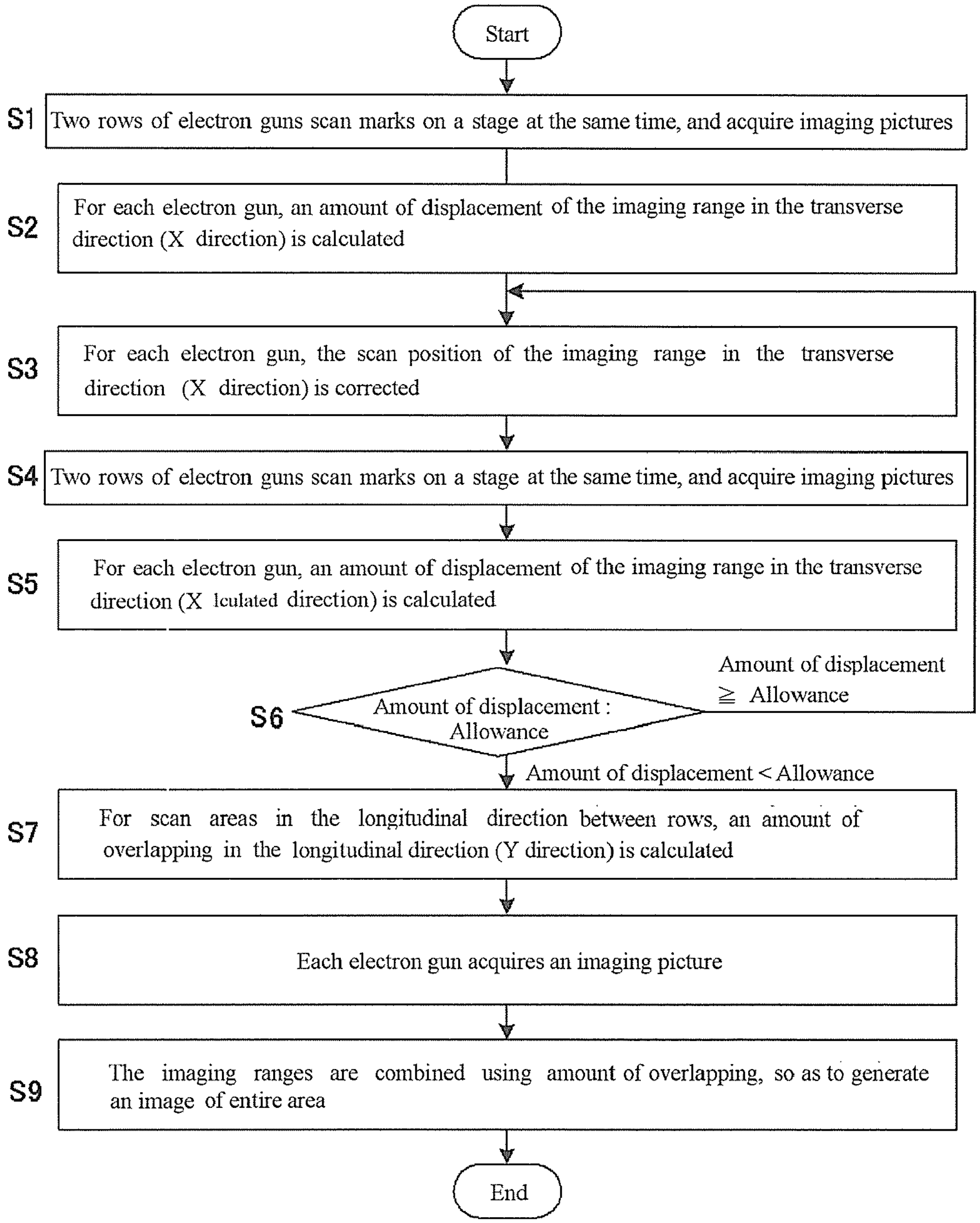
FIG. 6 is a flowchart illustrating an exemplary sequence of liquid crystal array inspection according to the present invention.
Figure 7A:
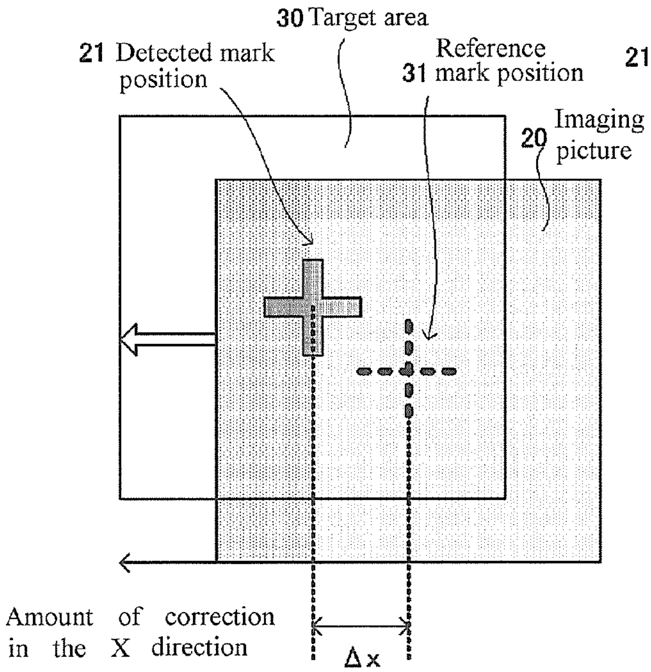
FIG. 7(*a*) to FIG. 7(*d*) are views illustrating exemplary imaging pictures of liquid crystal array inspection according to the present invention.
Figure 7C:
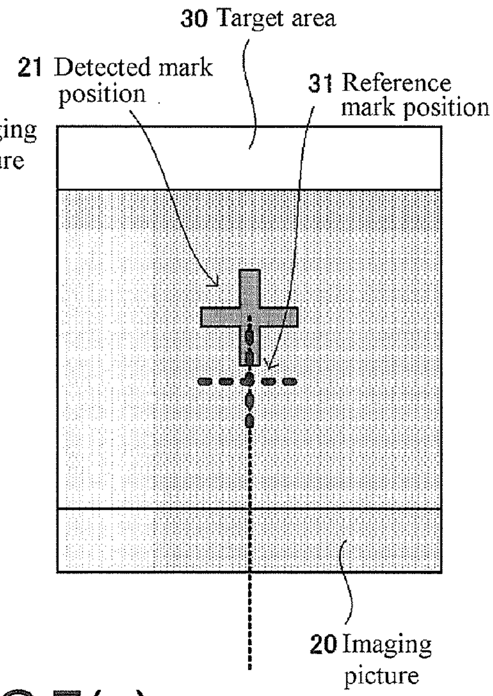
Figure 7B:
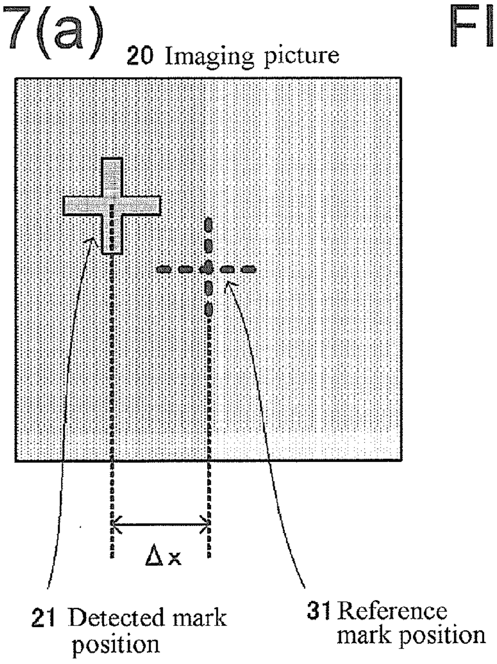
Figure 7D:
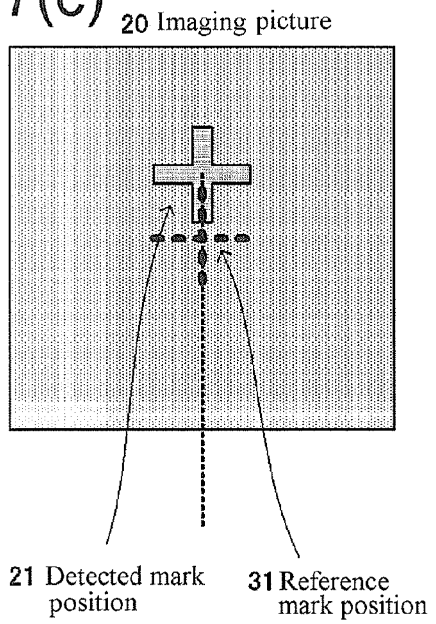
Figure 8:
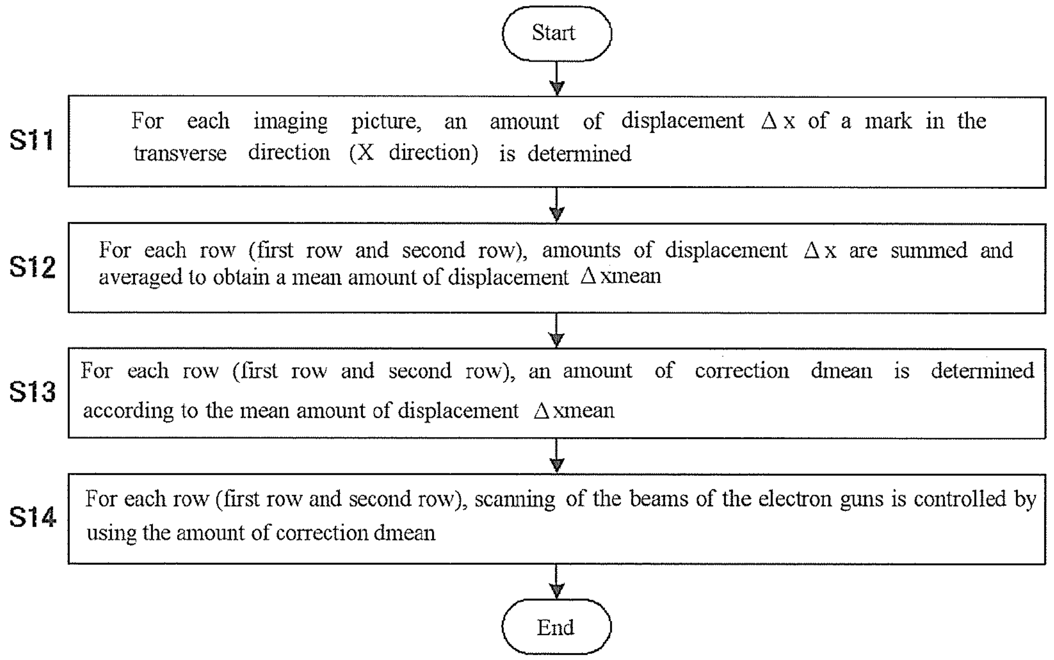
FIG. 8 is a flowchart illustrating an exemplary process for correcting imaging pictures in the X direction by using the same amount of correction for all electron guns of each row according to the present invention.
Figure 9:
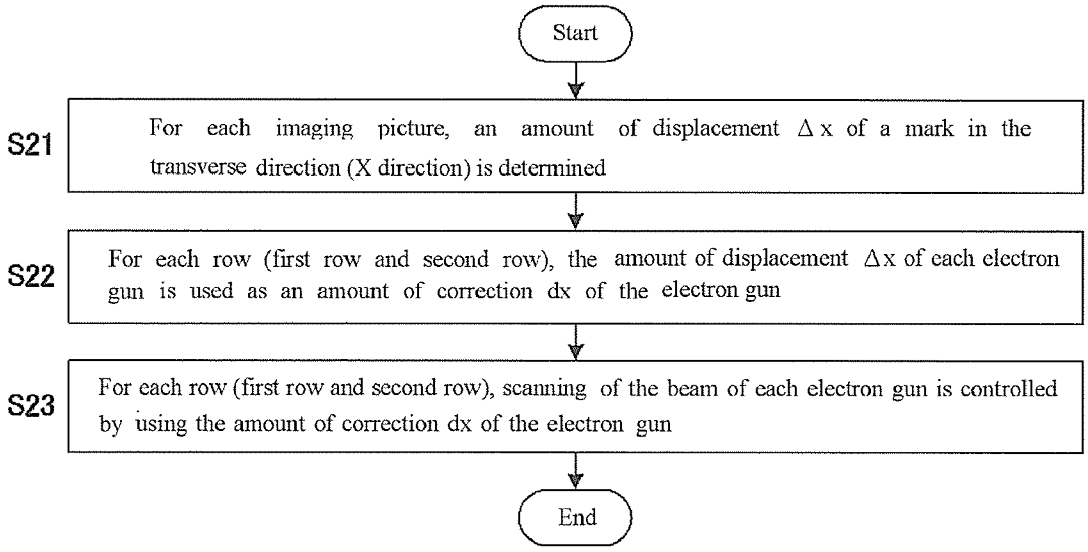
FIG. 9 is a flowchart illustrating an exemplary process for correcting imaging pictures in the X direction by an amount of correction for each electron gun of each row according to the present invention.
Figure 10A:
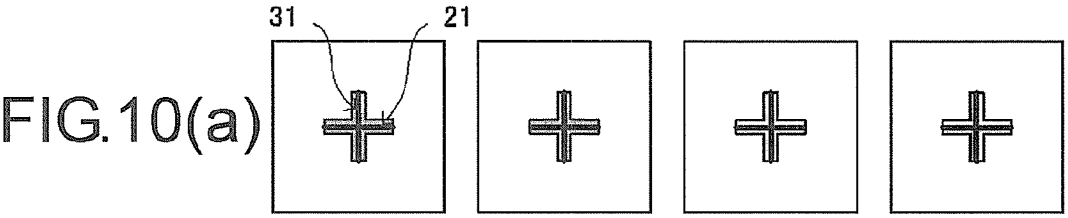
FIG. 10(*a*) to FIG. 10(*d*) are views illustrating an exemplary process for correcting imaging pictures in the X direction by an amount of correction for each electron gun of each row according to the present invention.
Figure 10B:
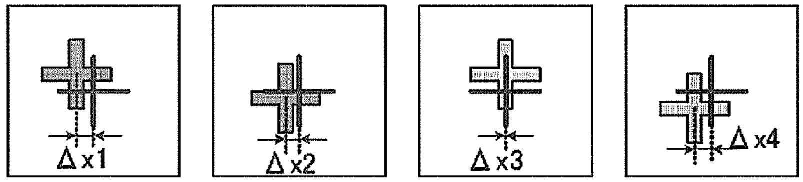
Figure 10C:
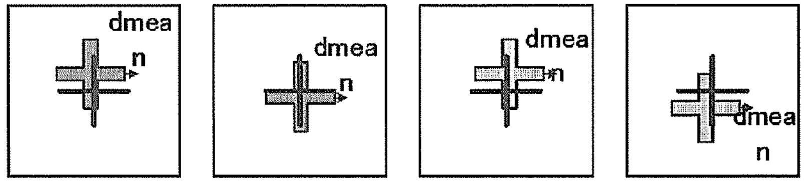
Figure 10D:
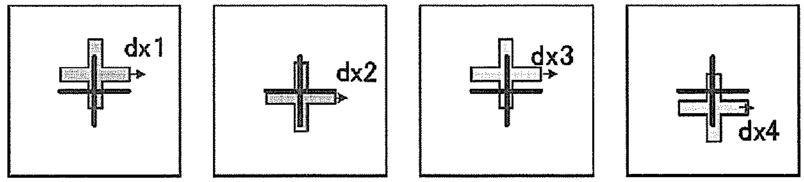

Then, an exemplary sequence of a liquid crystal array inspection according to the present invention is illustrated with reference to a flowchart of FIG. 6; views illustrating exemplary imaging pictures of FIG. 7(*a*) to FIG. 7(*d*); a flowchart and views illustrating calculation of an amount of correction of each imaging picture of FIG. 8, FIG. 9, and FIG. 10(*a*) to FIG. 10(*d*); and views illustrating calculation of an amount of overlapping in the Y direction of FIG. 11(*a*) to FIG. 11(*c*) and FIG. 12(*a*) to FIG. 12(*f*).

Firstly, a first row and a second row of electron guns scan a row of marks configured in an X direction on a stage at the same time, and acquire the imaging pictures (S1).

An amount of displacement Δx of each imaging picture acquired by each electron gun in the X direction is calculated (S2), and the scan position of the electron gun in the X direction is corrected based on the calculated amount of displacement Δx. The scan position may be corrected, for example, by the following method. A value inverse to and having the same magnitude as the calculated amount of displacement Δx is used as a correction value, and the scan control part applies a voltage corresponding to the amount of correction to a deflection part to control the amplitude of the moving-to-and-fro of the electron beam, so as to adjust the position of the scan range in the X direction (S3).

After the scan position of the electron gun in the X direction is corrected, similar to Step S1, the two rows of electron guns, configured as the first row and the second row, scan and image the same mark on the stage at the same time (S4). Further, similar to Step S2, the amount of displacement Δx of the imaging picture acquired by each electron gun in the X direction is calculated (S5).

The calculated amount of displacement Δx in Step S5 is compared with a preset allowance (S6). When the amount of displacement Δx is larger than the allowed displacement, Steps S3 to S5 are repeated, so as to reduce the amount of displacement Δx.

In addition, in Step S5, when the amount of displacement Δx does not exceed the allowed displacement, the amount of displacement in the Y direction is calculated and corrected. The amount of displacement in the Y direction is calculated and corrected according to an amount of overlapping of adjacent imaging ranges in the Y direction (S7).

After the position of the electron gun is corrected in Step S7, each electron gun scans a portion of a target area, so as to acquire a plurality of imaging pictures (S8). The acquired imaging pictures are combined to generate an imaging picture of the entire target area. Adjacent imaging pictures in the Y direction overlap in an overlapping area, so that in the image generating process, the two imaging pictures are overlapped in the overlapping area according to the calculated amount of overlapping and the overlapping central position calculated in Step S7 (S9).

FIG. 7(*a*) to FIG. 7(*d*) illustrate an example of Steps S2 and S3 for calculating the amount of displacement and the amount of correction of each imaging picture in the X direction.

FIG. 7(*a*) shows a relation between the target area 30 and the imaging range 20 when a displacement occurs in the X direction as shown in FIG. 4(*c*), and FIG. 7(*b*) shows the imaging range 20 obtained at this time. In FIG. 7(*b*), a detection mark is detected in the imaging range 20. A difference between a detected mark position 21 and a reference mark position 31 detected in the imaging range 20 represents the displacement, and an amount of movement of the electron guns in the X direction required by overlapping the imaging range 20 with the target area 30 represents the amount of correction in the X direction.

FIG. 7(*c*) shows a relation between the target area 30 and the imaging range 20 after the displacement in the X direction is corrected, and FIG. 7(*d*) shows the imaging range 20 obtained at this time. In the scanning process of the electron beam of the electron gun, only the amount of correction in the X direction is deflected for scanning, so that as shown in FIG. 7(*d*), the detected mark position 21 and the reference mark position 31 in the imaging range 20 could be consistent.

Moreover, in FIG. 7(*a*) to FIG. 7(*d*), the reference mark position 31 is not detected as an image in the imaging picture, but represents a predetermined position relative to the imaging range 20, and the reference mark position 31 may be represented by position coordinates of an area relative to the imaging range 20.

The calculation and correction of the imaging pictures in the X direction may be implemented in a plurality of aspects. In the following, two aspects are illustrated with reference to FIG. 8~FIG. 10(*a*) to FIG. 10(*d*). Moreover, FIG. 8 is a flowchart illustrating a first aspect, FIG. 9 is a flowchart illustrating a second aspect, and FIG. 10(*a*) to FIG. 10(*d*) show a relation between the detected mark position and the reference mark position in the imaging picture.

The first aspect is an aspect for correcting imaging pictures in the X direction by using the same amount of correction for all electron guns of each row, and the second aspect is an aspect for correcting imaging pictures in the X direction by using an amount of correction for each electron gun of each row.

The first aspect is illustrated. When imaging pictures in the X direction are corrected by using the same amount of correction for all electron guns of each row, an amount of displacement Δx between the detected mark position and the reference mark position in the X direction is determined according to the imaging picture acquired by each electron gun (S11). For each row, the amounts of displacement Δx in the X direction are summed and then averaged to obtain a mean amount of displacement Δxmean. When the rows of electron guns in the X direction are the first row and the second row, the mean amount of displacement Δxmean is calculated corresponding to each of the first row and the second row (S12).

For each row, the mean amount of displacement Δxmean is set as an amount of correction dmean. The amount of correction dmean is determined for each row, and is set as a common amount of correction of the electron guns in the row (S13). For the electron guns of each row, scanning of the electron beam is controlled by using the calculated amount of correction dmean (S14).

FIG. 10(*a*) shows the situation when the detected mark position 21 (denoted by solid lines) and the reference mark position 31 (denoted by dashed lines) in each imaging picture are consistent, and FIG. 10(*b*) shows a deflection state of each imaging picture of a row, and shows states of deflection by the amounts of displacement Δx1 to Δx4 respectively.

FIG. 10(*c*) shows imaging pictures acquired by controlling the scanning of each electron gun using an amount of correction dmean, in which the amount of correction dmean is an amount of correction determined according to the mean amount of displacement Δxmean obtained by averaging the amounts of displacement Δx1 to Δx4. When the mean amount of displacement is used to control the scanning of each electron gun, the scan control part may control a plurality of electron guns in the row according to a control signal. Accordingly, the amount of displacement of the imaging range of each electron gun is corrected averagely.

The second aspect is illustrated. When imaging pictures in the X direction are corrected by using an amount of correction for each electron gun of each row, an amount of displacement Δx between the detected mark position and the reference mark position in the X direction is determined according to the imaging picture acquired by each electron gun (S21), and for each row, the amount of displacement Δx of each electron gun in the X direction is set as an amount of correction dx of the electron gun. The amount of correction dx is determined for each electron gun (S23), and for each electron gun, scanning of the electron beam is controlled according to the calculated amount of correction dx (S24).

FIG. 10(*d*) shows the imaging pictures acquired by controlling the scanning of each electron gun using the amounts of correction dx1 to dx4, in which the amounts of correction dx1 to dx4 are the amounts of correction calculated corresponding to the amounts of displacement Δx1 to Δx4. When the amount of displacement of each electron gun is used to control the scanning of the electron gun, the amount of displacement of the imaging range of each electron gun may be corrected respectively.

Then, an example of calculating and correcting a displacement in the Y direction by using an amount of overlapping of adjacent imaging pictures in the Y direction is illustrated with reference to FIG. 11(*a*) to FIG. 11(*c*) and FIG. 12(*a*) to FIG. 12(*f*).

Figure 11A:
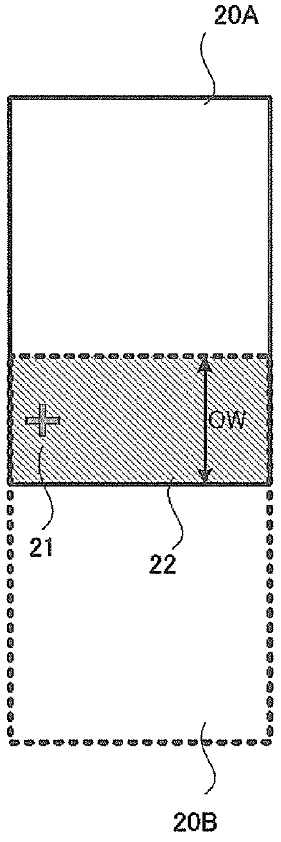
FIG. 11(*a*) to FIG. 11(*c*) are views illustrating the calculation of an amount of overlapping in a Y direction according to the present invention.
Figure 11B:
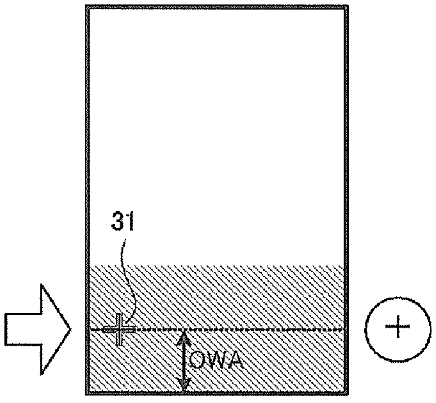
Figure 11C:
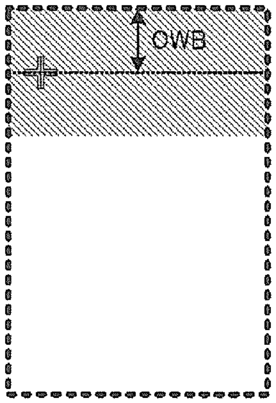
Figure 13A:
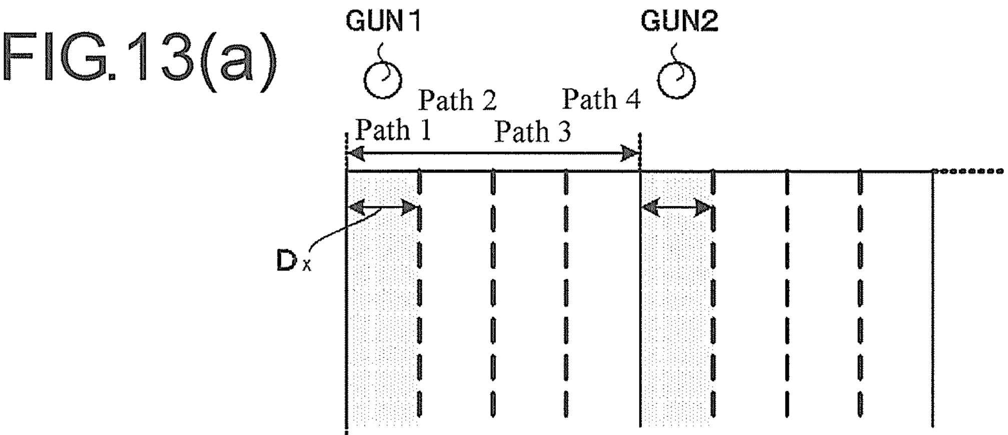
FIG. 13(*a*) to FIG. 13(*c*) are views illustrating a scanning of a liquid crystal substrate with electron beams in the prior art.
Figure 13B:
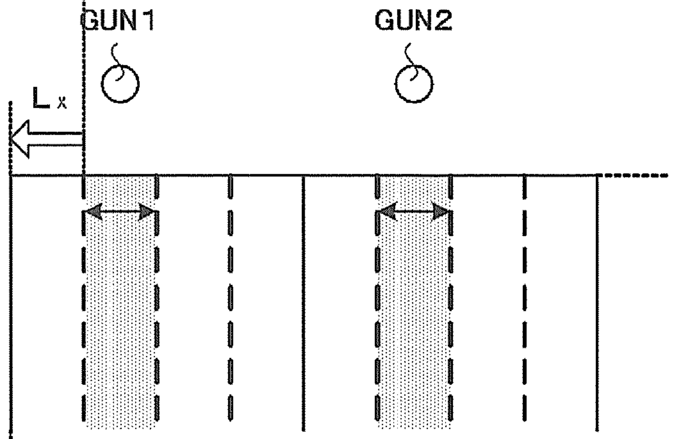
Figure 13C:
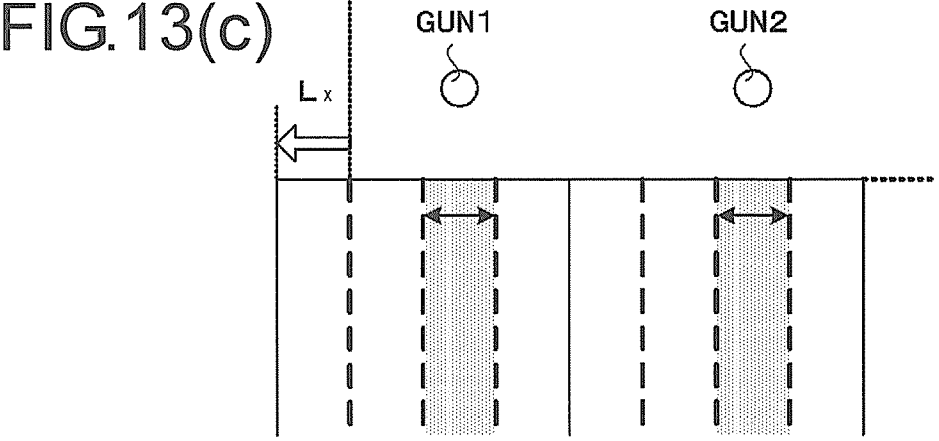

FIG. 11(*a*) to FIG. 11(*c*) show adjacent imaging pictures in the Y direction. In FIG. 11(*a*), an imaging range 20A and an imaging range 20B share an overlapping area 220. The overlapping area 22 is a common portion by scanning the imaging range 20A and the imaging range 20B. Two adjacent electron guns in the Y direction scan such that the detected mark position 21 is written into the overlapping area 22.

FIG. 11(*b*) shows the imaging range 20A, and FIG. 11(*c*) show the imaging range 20B. Moreover, there is no displacement in the X direction and the Y direction. When there is no displacement in the Y direction for the imaging range 20A and the imaging range 20B, the positions of the detected mark position 21 and the reference mark position 31 in the Y direction are consistent.

An amount of overlapping OW of the overlapping area 22 in the Y direction is represented by a sum of OWA in the imaging range 20A and OWB in the imaging range 20B (OWA+OWB).

The amount of overlapping OWA may be determined according to the length between the reference mark position 31 in the imaging range 20A and the lower end of the imaging range 20A. In addition, the amount of overlapping OWB may be determined according to the length between the reference mark position 31 in the imaging range 20B and the upper end of the imaging range 20B.

FIG. 12(*a*) to FIG. 12(*f*) show a state in which there is a displacement in the imaging range in the Y direction, FIG. 12(*a*) to FIG. 12(*c*) show the situation when the imaging range 20A is displaced towards the upper side of the figure, and FIG. 12(*d*) to FIG. 12(*f*) show the situation when the imaging range 20B is displaced towards the lower side of the figure.

In FIG. 12(*a*) to FIG. 12(*c*), when the imaging range 20A is displaced in the Y direction (towards the upper side of the figure here) the detected mark position 21 is displaced from the reference mark position 31 towards the Y direction, and the positions of the detected mark position 21 and the reference mark position 31 in the Y direction are consistent.

The amount of overlapping OW of the overlapping area 22 in the Y direction is represented by a sum of OWA in the imaging range 20A and OWB in the imaging range 20B (OWA+OWB).

In FIG. 12(*b*), the amount of overlapping OWA may be determined according to the length between the reference mark position 31 in the imaging range 20A and the lower end of the imaging range 20A, and the length between the detected mark position 21 and the reference mark position 31 represents an amount of displacement Δy1.

In addition, in FIG. 12(*c*), the amount of overlapping OWB may be determined according to the length between the reference mark position 31 in the imaging range 20B and the upper end of the imaging range 20B. Here, the positions of the detected mark position 21 and the reference mark position 31 in the Y direction are consistent, which indicates that there is no displacement in the Y direction. In this case, the amount of correction is calculated based on the amount of displacement Δy1.

In addition, in FIG. 12(*d*) to FIG. 12(*f*), when there is a displacement in the imaging range 20A in the Y direction (towards the lower side of the figure here), the detected mark position 21 is displaced from the reference mark position 31 towards the Y direction, and the positions of the detected mark position 21 and the reference mark position 31 in the Y direction are consistent.

The amount of overlapping OW of the overlapping area 22 in the Y direction is represented by a sum of OWA in the imaging range 20A and OWB in the imaging range 20B (OWA+OWB).

In FIG. 12(*e*), the amount of overlapping OWA may be determined according to the length between the reference mark position 31 in the imaging range 20A and the lower end of the imaging range 20A, and the length between the detected mark position 21 and the reference mark position 31 represents an amount of displacement Δy2.

In addition, in FIG. 12(*f*), the amount of overlapping OWB may be determined according to the length between the reference mark position 31 in the imaging range 20B and the upper end of the imaging range 20B. Here, the positions of the detected mark position 21 and the reference mark position 31 in the Y direction are consistent, which indicates that no displacement occurs in the Y direction. In this case, the amount of correction is calculated based on the amount of displacement Δy2.

INDUSTRIAL APPLICABILITY

The present invention is applicable to an electron ray micro-analyser, a scanning electron microscope, an X-ray analysis apparatus or the like.

What is claimed is:

1. A liquid crystal array inspection apparatus, for acquiring imaging pictures by scanning a liquid crystal substrate in a two-dimensional manner with electron beams to inspect a liquid crystal substrate array based on the imaging pictures, comprising:

a stage, for carrying the liquid crystal substrate;

a plurality of electron guns, configured above the stage in an X direction and a Y direction;

a scan control part, for controlling the scanning with the electron beams of the electron guns;

a plurality of detectors, for detecting secondary electrons emitted during the scanning with the electron beams of the electron guns;

an image processing part, for generating imaging pictures of imaging ranges scanned by the plurality of electron guns according to detection signals of the detectors;

an correction-amount calculating part, for determining amounts of displacement of the imaging range of each electron gun in the X direction and the Y direction according to the imaging picture, generated by the image processing part, of the stage, and calculating amounts of correction for correcting displacements of the imaging range of the each electron gun in the X direction and the Y direction according to the amounts of displacement; and a defect determining part, for inspecting a defect of the liquid crystal substrate array according to the imaging pictures, generated by the image processing part, of the substrate, wherein the scan control part controls the scanning with the electron beam in the X direction based on the amount of correction for correcting the displacement of the imaging range in the X direction calculated by the correction-amount calculating part.

2. The liquid crystal array inspection apparatus according to claim 1, wherein:

the stage comprises a plurality of marks along the X direction on a surface opposite to the electron guns, an interval between the marks in the X direction is the same as an interval between the electron guns in the X direction, the image processing part generates the imaging picture of the each electron gun, the correction-amount calculating part applicable for implementing functions that comprise:

identifying a mark in each imaging picture and detecting a position of the identified mark;

determining the amount of displacement of the imaging range of the each electron gun in the X direction according to a difference between the detected position of the mark and a reference position of the mark; and calculating the amount of correction of the imaging range of the each electron gun in the X direction according to the amount of displacement in the X direction;

determining the amount of displacement of the imaging range of the each electron gun in the Y direction according to the detected position of the mark and the reference position of the mark in adjacent imaging pictures in the Y direction; and calculating the amount of correction of the imaging range of the each electron gun in the Y direction according to the amount of displacement in the Y direction, and the scan control part controls the scanning with the electron beam in the X direction, and corrects the imaging range in the X direction, based on the amount of correction of the imaging range of the each electron gun in the X direction calculated by the correction-amount calculating part.

3. The liquid crystal array inspection apparatus according to claim 2, wherein:

the correction-amount calculating part applicable for implementing functions that comprise:

for each row of plurality of electron guns arranged in the X direction, calculating a mean value of the difference between the detected position and the reference position of the mark in the X direction determined according to the imaging range of the each electron gun in the each row to serve as an amount of displacement of the row in the X direction; and calculating an amount of correction of the imaging ranges of the each row of the electron guns in the X direction according to the amount of displacement, and the correction-amount calculating part applicable for implementing functions that comprise:

for an overlapping area of the imaging ranges of two adjacent electron guns in the Y direction, calculating an amount of overlapping according to the difference between the detected position of the mark and the reference position of the mark of each imaging range;

calculating the amount of displacement of each imaging range of the imaging ranges of the two adjacent electron guns in the Y direction according to the amount of overlapping of the imaging ranges of the imaging ranges of the two adjacent electron guns in the Y direction; and calculating the amount of correction for correcting mounting positions of the two adjacent electron guns in the Y direction according to the amount of displacement.

4. A method for correcting an imaging range of a liquid crystal array inspection apparatus, by acquiring imaging pictures via scanning a liquid crystal substrate in a two-dimensional manner with an electron beam to inspect a liquid crystal substrate array based on the imaging pictures, wherein:

a plurality of electron guns acquiring the imaging pictures is arranged above a stage carrying the liquid crystal substrate in an X direction, and at least two rows of the plurality of electron guns are configured in a Y direction, and the method for correcting the imaging range of the liquid crystal array inspection apparatus comprises the following steps:

acquiring the imaging pictures by scanning the stage with the electron beams of the plurality of electron guns;

determining amounts of displacement of an imaging range of the each electron gun in the X direction and the Y direction according to the acquired imaging pictures, and calculating amounts of correction for correcting displacements of the imaging range of the each electron gun in the X direction and the Y direction according to the amounts of displacement;

controlling the scanning with the electron beam in the X direction based on the calculated amount of correction of the imaging range of the each electron gun in the X direction; and aligning a mounting position of the each electron gun in the Y direction based on the calculated amount of correction of the imaging range of the each electron gun in the Y direction.

5. The method for correcting the imaging range of the liquid crystal array inspection apparatus according to claim 4, wherein the liquid crystal array inspection apparatus comprises a plurality of marks along the X direction on a surface of the stage opposite to the plurality of electron guns, and an interval between the marks in the X direction is the same as an interval between the electron guns in the X direction, the step of calculating the amounts of correction comprises:

identifying a mark of the plurality of marks in each imaging picture and detecting a position of the identified mark, determining the amount of displacement of the imaging range of the each electron gun in the X direction according to a difference between the detected position of the mark and a reference position of the mark, and calculating the amount of correction of the imaging range of the each electron gun in the X direction according to the amount of displacement of the imaging range of the each electron gun in the X direction; and determining the amount of displacement of the imaging range of the each electron gun in the Y direction according to the detected position of the mark and the reference position of the mark in adjacent imaging pictures in the Y direction, and calculating the amount of correction of the imaging range of the each electron gun in the Y direction according to the amount of displacement of the imaging range of the each electron gun in the Y direction, and the step of controlling the scanning in the X direction comprises controlling the scanning with the electron beam in the X direction, and correcting the imaging range in the X direction, based on the calculated amount of correction of the imaging range of the each electron gun in the X direction.

6. The method for correcting the imaging range of the liquid crystal array inspection apparatus according to claim 5, wherein the step of calculating the amounts of correction comprises:

for each row of the at least two rows of the electron guns arranged in the X direction, calculating a mean value of the difference between the detected position and the reference position of the mark in the X direction determined according to the imaging range of the each electron gun in the each row of the at least two rows to serve as the amount of displacement of the each row of the at least two rows in the X direction, and calculating the amount of correction of the imaging ranges of the each row of the at least two rows of electron guns in the X direction according to the amount of displacement of the each row of the at least two rows in the X direction, for an overlapping area of the imaging ranges of two adjacent electron guns in the Y direction, calculating an amount of overlapping of the imaging ranges according to the difference between the detected position of the mark and the reference position of the mark of the each imaging range, calculating an amount of displacement of the imaging range of the each electron gun in the Y direction according to the amount of overlapping of the imaging ranges, and calculating the amount of corrections for correcting mounting positions of the two adjacent electron guns in the Y direction according to the amount of displacement of the imaging range of the each electron gun in the Y direction.

* * * * *